United States Patent [19]

Lehnhardt et al.

[11] 4,370,267

[45] Jan. 25, 1983

[54] FRACTIONATION AND ISOLATION OF 7S AND 11S PROTEIN FROM ISOELECTRICALLY PRECIPITATED VEGETABLE PROTEIN MIXTURES

[75] Inventors: William F. Lehnhardt, Decatur; Paul W. Gibson, Mt. Zion; Frank T. Orthoefer, Decatur, all of Ill.

[73] Assignee: A. E. Staley Manufacturing Company, Decatur, Ill.

[21] Appl. No.: 291,760

[22] Filed: Aug. 10, 1981

[51] Int. Cl.³ .............................................. A23J 1/14
[52] U.S. Cl. ............................ 260/123.5; 260/112 R; 426/52; 426/63; 426/634; 426/656; 435/18; 435/23; 435/24; 435/272
[58] Field of Search ....................... 260/123.5, 112 R; 435/18, 23, 24, 272

[56] References Cited

U.S. PATENT DOCUMENTS

| | | | |
|---|---|---|---|
| 1,373,651 | 4/1921 | Cullen | 426/656 X |
| 2,381,407 | 8/1945 | Levinson et al. | 260/112 |
| 2,489,208 | 11/1949 | Turner | 195/29 |
| 2,502,029 | 3/1950 | Sair et al. | 99/14 |
| 3,502,482 | 4/1950 | Sair et al. | 99/14 |
| 3,814,816 | 6/1974 | Gunther | 426/46 |
| 3,870,801 | 3/1975 | Tombs | 426/92 |
| 3,953,611 | 4/1976 | Youngquist | 426/93 |
| 4,188,399 | 2/1980 | Shemer | 260/123.5 X |

FOREIGN PATENT DOCUMENTS 1377392 12/1974 United Kingdom .

OTHER PUBLICATIONS

Smith et al.—Peptization of Soybean Proteins . . . Salts—Ind. & Eng. Chem., vol. 30, No. 12, 1938, pp. 1414-1418.
Thanh et al.—Major Proteins of Soybean Seeds . . . Characterization—Jr. Agr. & Food Chem., vol. 24, No. 6, 1976, pp. 1117-1121.
Eldridge et al.—Purification of the 11S Component of Soybean Protein—Cereal Chem., vol. 44, Nov. 1967, pp. 645-654.
Briggs et al.—An Electrophoretic Analysis of Soybean Protein—Cereal Chemistry, vol. 27, May 1950, pp. 243-257.
Wolf et al.—Purification and Characterization of the 11S Component of Soybean Proteins—Archieves of Biochem. & Biophys. 85, pp. 186-199, (1959).
Enzyme Nomenclature—Recommendations (1972) of the International Union of Pure and Applied Chemistry & The International Union of Biochemistry.

Primary Examiner—Howard E. Schain
Attorney, Agent, or Firm—M. Paul Hendrickson; Charles J. Meyerson

[57] ABSTRACT

The 7S and 11S proteins of vegetable proteins may be effectively fractionated and isolated by selectively extracting 7S proteins from an isoelectrically precipitated mixture of 7S and 11S protein in the presence of water-soluble salts. The initial 7S extraction is typically conducted at a pH 5.0-5.6. An enriched 11S fraction is recovered by separating the water-insoluble 11S protein from the water-soluble enriched 7S extract.

13 Claims, No Drawings

FRACTIONATION AND ISOLATION OF 7S AND 11S PROTEIN FROM ISOELECTRICALLY PRECIPITATED VEGETABLE PROTEIN MIXTURES

BACKGROUND OF THE INVENTION

The functional and chemical properties of vegetable proteins are complex. Vegetable seed materials contain a diverse mixture of protein molecules and protein aggregates. A typical commercial vegetable seed protein extract contains a mixture of 2S, 7S, 11S and 15S proteins which respectively correspond to peak molecular weights of approximately 25,000, 160,000, 350,000 and 600,000, as analyzed by ultracentrifugation. In the commercial manufacture of isolates, these protein components are typically isolated from the vegetable seed water-solubles by a precipitating pH adjustment within the 4.2–4.6 range. Other vegetable seed protein components are the whey proteins. Due to the processing conditions conventionally used in the isolate manufacture, the whey proteins are normally not present in the commercial isolate product. The whey proteins are water-soluble molecules of a low molecular weight which remain in aqueous solution within the pH 4.2–4.6. A fraction identified as 9S is believed to be a dimer of the 7S fraction formed under conditions of low ionic strength. A typical commercial extraction process will yield a protein mixture comprised of approximately 22% 2S, 37% 7S, 31% 11S and 11% 15S.

Complex laboratory techniques have been devised for isolating and characterizing these diverse protein fractions. Such techniques, however, are impractical for a commercial operation. It has been observed that minor differences in the fractionation process often significantly alter the character and composition of the isolated product.

Smith et al. (Peptization of Soybean Proteins—Extraction of Nitrogenous Constituents from Oil-Free Meal by Acids and Bases with and without Added Salts—*Industrial & Engineering Chemistry,* Vol 30, No. 12, 1938, pages 1414–1418) disclose a solubility curve for the extraction of soy proteins under varying pH conditions. The minimum soy protein extraction was reported to be within the pH 4.0–5.0 range.

U.S. Pat. No. 4,188,399 by Shemer discloses extracting an enriched 7S protein fraction from defatted soybean materials by conducting the extraction within the pH 5.1–5.9 range. The enriched 7S isolate fraction is recovered by adjusting the extract to pH 4.5 which precipitates the 7S along with extracted 2S and 9.9S proteins. British Patent Specification No. 1,377,392 reports the precipitation of protein isolates from the aqueous defatted soybean extracts in the presence of water-soluble sulfite, bisulfite or dithionite salts. U.S. Pat. No. 2,489,208 (J. R. Turner) discloses the extraction of glycinin at a pH 6.4–6.8 which is then precipitated from the extract by a pH adjustment with sulfur dioxide to a pH 4.2–4.6 range.

Thanh et al. (*Jr. Agr. Food Chem.,* Vol. 24, No. 6, 1976, pages 1117–1121) discloses a preparative technique for precipitating 11S from a crude extract of 7S and 11S soy globulin mixture by adjusting the protein extract buffered with dilute tris(hydroxymethyl)aminoethane to a pH 6.6. The acid-precipitated 11S protein is recovered by centrifugation and the 7S protein plus other protein extracts are isolated from the supernatant by pH 4.8 acid-precipitation. The 7S precipitate was redissolved in water, buffered with tris and adjusted to pH 6.2 to solubilize the 7S therefrom. The pH, ionic strength, tris buffer and protein concentration reportedly affect the efficacy of the 7S and 11S fractionation.

Other references reporting upon the 7S, 11S separation include: "Purification of the 11S Components of Soybean Protein" by Eldridge et al. (*Cereal Chemistry,* Vol. 44, November 1967, pages 645–652), "An Electrophoretic Analysis of Soybean Protein" by Briggs et al. (*Cereal Chemistry,* Vol. 27, May 1950, pages 243–257), "Purification and Characterization of the 11S Component of Soybean Proteins" by Wolf et al. (*Archieves of Biochemistry and Biophysics* 85, pages 186–199 (1959)), U.S. Pat. No. 3,953,611 by Youngquist and U.S. Pat. No. 3,870,801 by Tombs.

Numerous patents have also reported the enzymatic treatment of vegetable seed proteins for purposes of modifying the protein properties. Illustrative patents pertaining to the enzymatic modification of vegetable seed proteins include U.S. Pat. Nos. 1,373,651 by Cullen, 2,381,407 by Levinson et al., 3,814,816 by Gunther, 2,502,029 and 2,502,482 by Sair et al. Heretofore enzymatic modifications have typically been conducted upon protein mixtures. The Gunther patent discloses enzymatically modified soy proteins useful as a vegetable aerating protein and as a casein or egg replacement for a variety of applications. Pursuant to the Gunther patent, vegetable proteins are extracted and hydrolyzed (acid or alkali) and subsequently treated with pepsin to provide an enzymatically modified vegetable protein hydrolyzate. Except for the Gunther patent, the commercial success of the enzymatically modified proteins has been limited.

DESCRIPTION OF THE INVENTION

According to the present invention there is provided a method for preparing enriched 7S and 11S fractions from crude vegetable protein 7S and 11S mixtures, said method comprising:

(a) adding to an aqueous slurry of crude vegetable protein isolate mixture, having a pH of less than 5.0 and containing on a total protein weight basis 7S and 11S protein as the major protein components, a water-soluble salt at a concentration ranging from 0.01 to 0.2 M and a sufficient amount of base to adjust the slurry to a pH 5.0–5.5;

(b) extracting a sufficient amount of 7S protein from the isolate mixture to provide an aqueous dispersion comprised of a soluble 7S protein fraction containing 7S protein as the major protein extract and an insoluble fraction containing, on a weight basis, 11S as the predominant protein constituent;

(c) partitioning the insoluble 11S fraction from the 7S fraction; and (d) recovering said partitioned 11S insoluble fraction and said soluble 7S fraction.

The present method provides a simplified and commercially feasible means for effectively fractionating crude 7S and 11S mixtures. Unlike the prior art multi-staged fractionation proposals, the present method accomplishes effective fractionation of crude 7S and 11S mixtures in one step. The method can provide a 7S fraction substantially free of 11S contamination and an enriched 11S fraction. This avoids the need to further refine and purify either the 7S or 11S fractions.

Under the present invention the relative purity of the 7S fraction may be controlled by the pH and salt concentration of the extracting solvent. This is particularly important when it is desired to recover an enriched 7S fraction by isoelectric precipitation. High-purity, isoelectrically precipitated 7S protein fractions tend to form highly visco-elastic gums which are often difficult to recover and manipulate. By including a small amount of 11S protein (e.g. less than 15%) the isoelectrically precipitated 7S protein is more easily manipulated and recovered. The ability to control the 7S and 11S ratio also affords a means for effectively tailoring the isolate product to functionally serve a wider variety of end uses.

The subject method differs from the prior art practice in that the fractionation process involves adjusting an acid-precipitated crude mixture of 7S and 11S protein (e.g. at a pH less than 5.0) towards a more neutral pH to extract the 7S protein by adding a neutralizing base. Traditional practice typically entails dissolving the crude mixture at a basic or neutral pH and adding acid to precipitate the protein fractions therefrom.

The fractionated 7S protein and 11S protein isolates of this invention possess certain unique functional properties which cannot be obtained under conventional fractionation processes. It is believed that these functional differences arise as a result of the unique conditions which are used to prepare 7S and 11S isolates herein.

The acid-precipitated vegetable protein used herein may be obtained from a variety of sources. Illustrative protein sources include defatted vegetable meals (e.g. 40% or more protein content) concentrates (e.g. 70 to 90% protein content), isolates (at least 90% protein content), mixtures thereof and the like. Crude 7S and 11S protein isolate mixtures, (dry, solution and/or slurry form) are a particularly suitable 7S and 11S mixture source material. Unlike the meals or concentrates, these isolates are characteristically substantially free from insoluble cellulosic fibers. By using the isolates, the need to remove these contaminants from the 11S fraction (e.g. clarification of an 11S solution) is avoided.

Illustrative vegetable protein sources for the crude proteins include oil-bearing seed materials such as cottonseeds, soybeans, sesame seeds, rape seed, sunflower seeds, safflower seeds, corn, wheat, mixtures thereof and the like. The defatted leguminous seed materials, especially defatted soybean material, are particularly suitable as a crude 11S and 7S mixture source material. Exemplary defatted soybean material sources for the 7S and 11S mixture includes soybean meal, soy flour, soy grits, soy protein concentrates, soy isolates, mixtures thereof and the like.

In a commercial operation, it is advantageous to extract the crude 7S and 11S isolate mixture, precipitate the protein and fractionate the 7S and 11S proteins in an integrated manufacturing operation. This will improve upon the recoverable yields of both the 7S and 11S fractions. The extraction of the water-solubles from defatted vegetable protein material is conducted at a pH level which extracts the 7S and 11S as well as the other soluble proteins and carbohydrate constituents from the material. Although it is feasible to extract below the isoelectric precipitation pH of the 7S and 11S protein (e.g. pH 3.0–4.0), the extraction is most appropriately conducted within the pH 6.0–10.0 range. Advantageously the extraction is conducted at a pH ranging from about 6.5–9.0 and preferably from about 7.0 to about 8.5. This pH range preserves the native characteristics of the 11S and 7S protein molecules and places the protein extract in a form which may be more easily fractionated and converted to the desired 7S and 11S end-product fractions.

Supplemental additives to facilitate the solubles extraction and preservation of the protein extract in a suitable form for the ensuing fractionation, protein recovery and/or protein modification step may be alternatively incorporated into the extracting medium.

The extracting solvent to defatted seed material weight ratio employed during the extraction step will generally fall between 5:1 to 20:1, and advantageously within the 7:1 to 15:1 range. Optimum 11S and 7S protein yields are achieved within the 8:1 to 12:1 ratio with about a 10:1 ratio providing the optimum conditions for 7S and 11S extraction.

Included amongst the factors influencing the confirmational characteristics of the protein extract are the pH, ionic strength, temperature and sulfurous ion content. The effect each factor has upon stabilizing the protein extract depends upon the stress any given factor or combination of factors places upon the extracted protein.

It is desirable to conduct the extraction under thermal conditions which protect the native rheological characteristics of the 7S and 11S protein extract. The 11S protein is sensitive to heat denaturization. Elevated temperatures (e.g. 50° C. or higher) may be used for relatively short periods of time (e.g. 2 minutes or less) without causing substantial denaturization of the 11S protein. In general, the extracting temperature will be most suitably conducted within about a 10° C. to 50° C. range, and advantageously, within about a 20° C. to about a 40° C. range.

Upon completion of the 11S and 7S extraction, the water-insolubles (e.g. cellulosic materials, if present), are advantageously separated (e.g. filtration, centrifugation, etc.) from the soluble extracts. This permits the subsequent isolation and recovery of protein components substantially free from cellulosic contamination.

The clarified protein extract mixture is then adjusted to a pH which precipitates the 11S and 7S proteins. The precipitating pH level typically falls within the pH 4.0–5.0 range. For most operations, the aqueous extract is advantageously adjusted within the pH 4.2–4.8 range (preferably from about 4.2 to about 4.4) to precipitate the protein.

The precipitating media will contain soluble extracts. Seed material extracts such as meal or flour will provide extracts which contain both soluble carbohydrate and whey proteins. Protein concentrates and isolates provide extracts substantially free from these water-solubles. If such water-soluble carbohydrates and whey proteins are present, it is convenient to separate the solubles from the insolubles. This separation can be accomplished by conventional means.

The crude 7S and 11S precipitate is adjusted to within the pH 5.0–5.6 range. Under these conditions the 7S protein becomes water-soluble and will be extracted from the acid precipitate while the 11S protein remains as an insoluble residue. The amount of 11S protein extracted from the precipitate along with 7S protein extract may be regulated by controlling the extracting solvent pH and ionic strength. A pH 5.1 extraction in the presence of 0.1 M sodium chloride solution and 7.5 mM sodium bisulfite will typically yield an extract containing greater than 90% 7S soy globulins. In addition to the 7S protein, the extract will typically contain trace amounts of 11S soy globulins, whey proteins and/or soluble carbohydrates, depending upon the purity of the crude 7S and 11S starting mixture.

The presence of water-soluble salt in the 7S extraction medium permits more effective 7S and 11S protein fractionation. The amount of water-soluble salt is maintained at a level sufficient to permit 7S protein extraction while effectively retaining the 11S as an insoluble residue. In general, the water-soluble salt requirements will be within the 0.01–0.2 range with more effective extraction and fractionation being accomplished within about 0.05 M to about 0.15 M range. Illustrative water-soluble salts include the alkali metal, alkaline earth metal and ammonium salts of mineral and organic acids. Included amongst such salts are halides (e.g. chloride), acetates, adipates, citrates, fumarates, lactates, malates, phosphates, propionates, succinates, tartrates, maleate salts, mixtures thereof and the like. If desired, the buffering affect of certain of these salts can be used to effectively maintain the extracting media at a specific pH level. Advantageously included as the water-soluble salts are the edible alkali metal salts, in an amount ranging from about 0.075 M to about the 0.125 M and preferably at about the 0.1 M concentration. Sodium chloride is the preferred salt.

Supplemental additives to facilitate the solubles extraction and preservation of the protein extract in a suitable form for the ensuing fractionation, protein recovery and/or protein modification step may be alternatively incorporated into the 7S extraction medium. Advantageously a small amount of sulfurous ion is added to the 7S extraction medium to improve upon the fractionation and quality of the isolated protein products. Sulfurous ion solutions or precursors thereof, such as sulfur dioxide or water-soluble salts which form sulfurous acids in water, may be used as a sulfurous ion source. The sulfurous ion concentration generally ranges from about 0.1 mM to about 25 mM and most typically within about the 1.0 mM to about 10 mM range. Illustrative water-soluble salts of sulfurous acids include the alkali metal sulfites (e.g. potassium or sodium salts of sulfite, bisulfite, pyrosulfite, metabisulfite, lithium sulfite) and other water-soluble producing salts and cations (e.g. ammonium) mixtures thereof and the like. The quality, character, composition and yield of the protein mixture are improved by the water-soluble salt and sulfurous ion combination.

In a more limited aspect of the invention the 7S extraction is conducted at a pH ranging from about 5.2 to 5.4 (preferably at about a pH of 5.3) with a sufficient amount of water-soluble salt to provide a molarity of about 0.075 M to about 0.125 M (preferably at about 0.1 M) and advantageously in combination with about 1.0 mM to about 10 mM $NaHSO_3$ to provide a 7S extract containing at least 75% 7S protein and less than 15% 11S protein.

Upon completion of the 7S extraction, the water-insoluble 11S residue is partitioned from the water-soluble 7S fraction to provide an enriched 11S isolate precipitate and an enriched water-soluble 7S fraction or extract. The insoluble 11S fraction may be partitioned and recovered by conventional recovery techniques (e.g. cooling, decantation, centrifugation, filtration, etc.) or further processed by washing, redissolving in aqueous solutions, drying (e.g. spray-, vacuum-, freeze-, drum-, etc. drying), enzymatic treatment, etc.

Recovery of enriched 7S extract may likewise be accomplished by conventional recovery techniques. If desired, the enriched 7S fraction may be dried, subjected to filtration and/or acid precipitation to separate the enriched 7S fraction from water-solubles (e.g. whey protein and water-soluble carbohydrates, if present), enzymatically treated, isolated, further refined or directly used as a liquid binder, etc.

In addition to providing a simple process for effectively separating and isolating 7S and 11S protein from vegetative source materials, the present process affords a means for improving the amount of recoverable protein from vegetable materials. The isolation process does not significantly alter the native character of the protein isolate. The amount of salt used in the 11S and 11S/7S mixture isolation is sufficiently low so as to avoid waste disposal problems and permits recovery of an isolated fraction free from salt contamination.

In another embodiment of the invention, the 7S and/or 11S isolates produced in accordance with this invention are enzymatically modified with a peptide hydrolase to provide an enzymatically modified protein isolate. Peptide hydrolases are identified under 3.4 of *Enzyme Nomenclature* (1972) and include the peptidose (exopeptidases 3.4.11-15) and the proteinases (3.4.21-24). A wide variety of functionally different enzymatically modified isolate products may be treated by the isolated fraction with peptide hydrolase to modify the functional, chemical and physical properties of the isolates. Representative proteinases include pepsin, papain, trypsin, ficin, the acid proteinases, mixtures thereof and the like. The acid proteinases of 3.4.23, such as Pepsin A (3.4.23.1), Pepsin B (3.4.23.2), and Pepsin C (3.4.23.3), Chymosin (3.4.23.4), Cathepsin D (3.4.23.5), Aspergillus acid proteinase (3.4.23.6), Penicillium jantheinellum acid proteinase (3.4.23.7), Yeast proteinase A (3.4.23.8), Rhizopus acid proteinase (3.4.23.9), Endothia acid proteinase (3.4.23.10), mixtures thereof and the like are advantageously used to modify the isolated fractions. Pepsin has been found to be a particularly effective enzymatic modifying agent.

The primary purpose of the enzymatic modification is to alter the functional characteristics of the isolate. The digestive conditions, the enzyme and substrate selections, as well as the extent of hydrolysis, can be appropriately controlled so as to yield and impart functional properties to the isolate fraction. Factors contributing to the degree of enzymatic alteration include the composition of the isolate, the specific enzyme and its mode of hydrolysis, and the hydrolyzing conditions used to modify any given isolated fraction. The 7S to 11S ratio may be controlled to alter the compositional and functional properties of the enzymatically modified isolate product.

The digestive temperature, pH and other conditions employed to modify the isolate will depend largely upon the hydrolytic requirements of the enzyme and the substrate to be modified. The enzymatic hydrolytic requirements may be obtained by reference to the trade bulletins and patented literature. The inventors have found the enzymatic conditions disclosed by Gunther's U.S. Pat. No. 3,814,816 suitable for converting an 11S isolate into a soy protein whipping agent. The fractionation and isolation method of this invention can be applied to produce a broad spectrum of enzymatically modified isolates, tailor-made to fit a wide variety of applications.

For the 3.4.23 acid proteinases, the digestive temperatures and pH levels will typically range from about 25° C. to about 60° C. (preferably from about 35° C. to about 45° C.) and from about pH 1 to about pH 5, with about a pH 1.2 to about pH 2.5 being preferred.

The digested isolate may be directly recovered in its liquid form or subjected to further processing. Recovery of the digest solids may be achieved by dehydrating the digest, or, if appropriate, by a pH adjustment to precipitate the enzymatically modified isolate product from the digest. Such precipitated or curded digests may then be separated from the digest by conventional recovery (e.g. filtration, centrifugation, etc.) and/or refining techniques (e.g. washing and reconstituting in water), drying (e.g. drum, freeze, vacuum, spray, etc.) to provide the desired end-product.

The 7S and 11S analysis herein were determined upon the basis of their sodium dodecyl sulfate (SDS) polyacrylamide gel electrophoresis profiles. Quantitation of the individual species was obtained by densitometric scanning of the SDS gel profiles. The total 7S globulin fraction is a sum of the alpha', alpha and beta subunits as described by Thanh et al. (Biochem. Biophys. Acta., 490 (1977) 370–384). The total 11S soy globulin fraction is likewise the sum of the acidic and basic subunits as described by Catsimpoolas et al. (Jr. Sci. Food Agric., 22 (1971) 448–450). The 7S and 11S soy proteins were isolated by the procedure of Thanh et al. (Jr. Agric. Food Chem. 24 (1976) 1117–1121) and were used as standards for SDS polyacrylamide gel electrophoresis.

The SDS polyacrylamide gel electrophoresis was performed as described by Laemmli, Nature (London) 227 (1970) 680–685) with a vertical slab cell (Bio-Rad Laboratories, Richmond, Ca., Model 220) and D.C. power supply (LKB, Bromma, Sweden, 2103). The separating and stacking gels were 10.5% and 4.5% acrylamide, respectively. Soy protein samples and standards were solubilized in 0.0625 M Tris-HCl buffer, pH 6.8 containing 1.0% w/v SDS, 10% w/v glycerol, 2% w/v 2-Mercaptoethanol and heated for 5 minutes at 100° C. The gels (2) were run for 1.5 hr. at 30 mA followed by 1.5–2 hr. at 80 mA. Molecular weight calibration protein standards were obtained from Pharmacea Fine Chemicals (Piscataway, N.J., LMW kit).

The proteins were stained (Wang, K., Biochem. 16 (1977) 1857–1865) in 0.1% w/v Coomassee Blue R-250 in 2-propanol-acetic acid-water, 25-10-65, V/V/V. Destaining was performed in a slab diffusion destained (Bio-Rad Laboratories, Richmond Ca., Model 222) in 2-propanol-acetic acid-water, 10-10-80, V/V/V. The destained gels were scanned using a densitometer (E-C Apparatus Corp., Model EC-910) and dual channel, integrating OmniScribe® recorder (Houston Instruments, Austin, Tex., Model 5000).

The percent distribution of the soy proteins is calculated by sum of the areas of the individual subunit species representing the 7S or 11S soy protein aggregates divided by the total area of scan times 100 as determined by the following equations:

$$\% \ 7S \text{ protein} = \frac{\alpha' + \alpha + \beta}{\text{Total area of Scan}} \times 100 \qquad \text{I.}$$

$$\% \ 11S \text{ protein} = \frac{A \text{ Sub.} + B \text{ Sub.}}{\text{Total area of Scan}} \times 100 \qquad \text{II.}$$

wherein $\alpha'$, $\alpha$ and $\beta$ represent the major subunit species area of the 7S globulin as defined by Thanh et al.; and the A Sub. and B Sub. respectively represent the acidic and basic subunit areas of the 11S globulin as defined by Catsimpoolas et al.

EXAMPLE 1

A crude aqueous protein extract was prepared by initially slurrying 1 pbw medium soy I-grits[1] in 14 pbw water, (40° C. and adjusted to pH 8.0 with 25% NaOH) for one hour under low speed agitation. The spent grits were removed from the extract by centrifugation at 565×g using a 17" diameter perforated bowl head containing a canvas liner. The extract was processed through a Westfalia (Model SA-1) centrifuge to produce a clarified extract containing less than 0.2% suspended solids. The clarified extract contained 62.7% (N×6.25) of the I-grit protein.

[1]—Defatted (1.1% oil), 60 NSI, 53.6% protein soy "I" Grits (medium size) manufactured and sold by the A. E. Staley Manufacturing Company, Decatur, Ill.

The clarified extract (pH 8.0–7.8) was adjusted to pH 4.3 with 18% muriatic acid while continually stirring at a low speed. The isoelectrically precipitated curd was isolated by centrifugation at 565×g using a 17" solid bowl centrifuge.

The isoelectric curd (15 parts, d.s.b.) was dispersed, on a weight basis, in water (85 parts). Sodium bisulfite to produce a 7.5 mM solution and sodium chloride (to produce a 0.1 M solution) were added and the slurry was stirred for 30 minutes at 21.5° C., pH 4.5. An enriched 7S fraction was extracted from this slurry by adjusting its pH to 5.3 with 25% sodium hydroxide and stirring under low speed agitation for one hour at 22° C. The soluble extract (i.e. enriched 7S protein) was then separated from the insoluble residue by centrifugation at 565×g using a 17" solid bowl centrifuge and clarification of the extract in a Westfalia (Model SA-1) centrifuge. The pH 5.3 extract contained 89.0% 7S and the remainder traces of whey proteins and 11S. The separated insoluble fraction contained 70.5% 11S and 29.6% 7S, both on a total protein basis.

EXAMPLE 2

In this example, the pH of the extracting medium used to extract the enriched 7S from the crude isolate of Example 1 was conducted at various pH levels. The affect of the extraction pH upon the 7S and 11S concentration in the extract and insoluble residue is reported below:

| Composition of Enriched 7S Soluble and Insoluble 11S protein Fraction | | |
|---|---|---|
| %7S Globulins | Extracting Medium pH | %11S Globulins |
| Soluble Extract | | |
| 94.9 | 5.1 | trace |
| 88.7 | 5.2 | 8.9 |
| 78.2 | 5.3 | 13.3 |
| 66.9 | 5.4 | 23.4 |
| 57.1 | 5.5 | 32.1 |
| 46.6 | 5.6 | 41.7 |
| Insoluble Residue | | |
| 40.0 | 5.1 | 45.8 |
| 45.5 | 5.2 | 43.4 |
| 26.3 | 5.3 | 66.6 |
| 21.4 | 5.4 | 69.7 |
| 23.1 | 5.5 | 60.3 |
| Original Crude pH 4.3 Curd | | |
| 37.4 | | 51.0 |

As shown above, the more acid pH levels, within the pH 5.1–5.6 range extract, yield the highest purity 7S extract. As illustrated above, impurities in the 7S primarily arise from 11S contamination. At a pH level in excess of pH 5.3, a significantly higher level of 11S is extracted from the precipitate. The 11S purity of the insoluble residue, however, is improved by conducting the extraction at the more elevated pH levels due to the more complete solubilization of the 7S protein. If desired, the insoluble residue may be further refined by conventional fractionation and isolation techniques to improve upon the 11S purity.

EXAMPLE 3

The Example 1 insoluble 11S enriched fraction was converted into a soy protein whipping agent. The enzymatic modification was conducted by adjusting an aqueous mixture containing 15% by solids of the insoluble 11S isolate (d.s.b—water weight basis), 0.5% pepsin (based on solids, 1:10,000 activity) and 0.5% sodium bisulfite (protein dry solids weight basis) to pH 1.3, and digesting the dissolved 7S and 11S protein mixture for 4 hours at 37° C. The digestive action modified both the 7S and 11S proteins.

The enzymatically modified product was separated from the digest by heating at pH 1.3 for 1 hour at 80° C. followed by adjusting the pH to 5.1 with 25% sodium hydroxide. This heating step denatures and precipitates the unmodified soy proteins. The functionality and yield of the whipping agent are somewhat improved by this processing step.

The insoluble fraction was separated from the solubilized enzymatically modified enriched 11S isolate by filtration in the presence of filter aid and spray-dried to provide an enzymatically modified soy protein whipping agent.

The functional performance of the whipping agents were comparable in all test applications to those described in U.S. Pat. No. 3,814,816 by Gunther. The soy whipping agents, however, possessed improved flavor and color characteristics over the Gunther soy whipping agents.

The aforementioned process significantly simplifies the overall soy protein whipping agent manufacture. Enzymatic modification of the 11S mixture provides a means for manufacturing the product under milder thermal conditions which improves upon the enzymatically modified isolates flavor and color. Waste disposal and energy requirements are also substantially reduced by this method for producing soy whipping agents. Likewise, recoverable yields and efficacy of the protein modification were superior to those obtained under the Gunther examples.

What is claimed is:

1. A method for converting vegetable protein 7S and 11S mixtures into an enriched 7S protein fraction and an enriched 11S protein fraction, said method comprising:
   (a) adding to an aqueous vegetable protein slurry which contains isoelectrically precipitated 7S protein and 11S protein as the major protein components of said slurry a sufficient amount of base to adjust the pH of the slurry to a pH ranging from 5.0 to 5.6 and water-soluble salt to provide a water-soluble salt molar concentration ranging from about 0.01 M to about 0.2 M;
   (b) extracting a sufficient amount of 7S protein from the isoelectrically precipitated mixture to provide an enriched water-soluble 7S fraction and an enriched 11S water-insoluble fraction which contains, on a weight basis, 11S as the major water-insoluble protein;
   (c) partitioning the extracted 7S protein fraction from the water-insoluble 11S fraction; and
   (d) recovering the enriched 7S fraction and the enriched 11S fraction.

2. The method according to claim 1 wherein the vegetable protein consists essentially of soy protein.

3. The method according to claim 2 wherein the water-soluble salt concentration ranges from about 0.075 M to about 0.125 M.

4. The method according to claim 3 wherein the water-soluble salt consists essentially of sodium chloride.

5. The method according to claim 2 wherein in addition to the water-soluble salt the slurry contains from about 0.5 mM to about 25 mM sulfurous ion.

6. The method according to claim 2 wherein the 7S is extracted at a pH ranging from about pH 5.2 to about pH 5.4.

7. The method according to claim 3 wherein a sufficient amount of 7S protein is extracted from the isoelectrically precipitated mixture (on a total 7S protein and 11S protein weight basis) to provide a water-insoluble residue which contains at least 70% by weight 11S protein.

8. The method according to claim 7 wherein in addition to the water-soluble salt the slurry contains from about 1.0 mM to about 10 mM of sulfurous ion.

9. The method according to claim 8 wherein the water-soluble salt consists essentially of sodium chloride and the sulfurous ion source consists essentially of sodium bisulfite.

10. The method according to claim 4 wherein a sufficient amount of 7S protein is extracted from the isoelectrically precipitated mixture to provide a water-insoluble residue which, on a total 7S and 11S weight basis, contains at least 70% 11S protein.

11. The method according to claim 10 wherein an enriched 7S fraction containing, on a total 11S and 7S weight basis, at least 85% by weight 7S protein is recovered from the extracted 7S protein fraction.

12. The method according to claim 5 wherein the amount of base added to the slurry is maintained at a specified level to provide a 7S fraction having a predetermined proportion of 7S protein and 11S protein.

13. The method according to claim 2 wherein at least one of the recovered protein fractions is enzymatically modified with a peptide hydrolase.

* * * * *